W. B. ARMSTRONG.
CATCHING AND HOLDING DEVICE.
APPLICATION FILED JAN. 9, 1909.
951,671.
Patented Mar. 8, 1910.
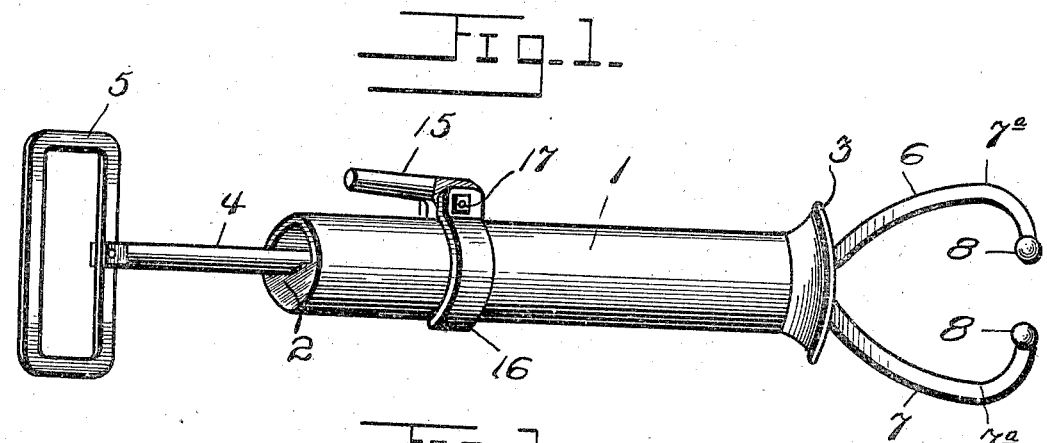
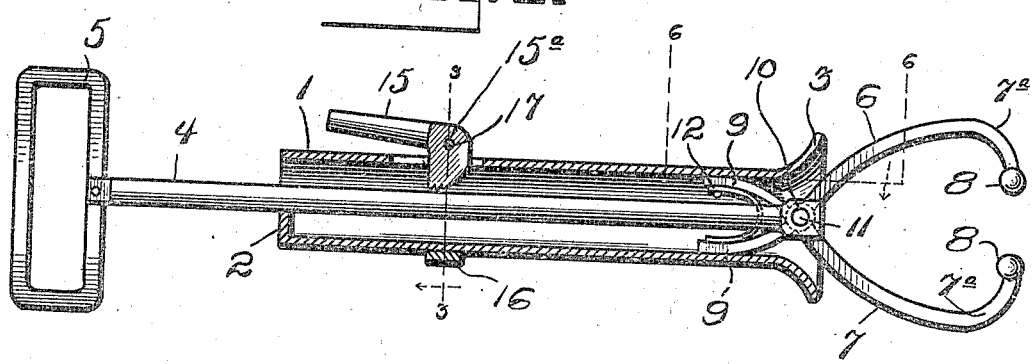
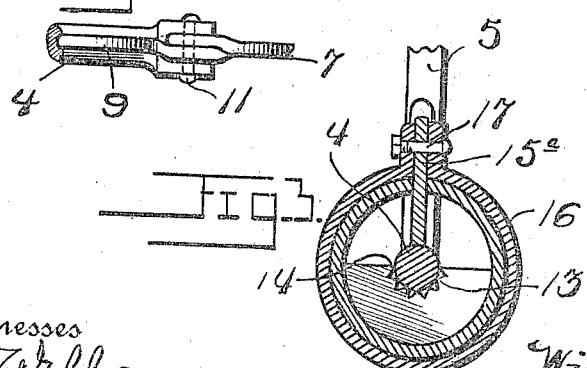
Witnesses
Inventor
William B. Armstrong.
By E. E. Vrooman,
his Attorney.

UNITED STATES PATENT OFFICE.

WILLIAM B. ARMSTRONG, OF SIGOURNEY, IOWA.

CATCHING AND HOLDING DEVICE.

951,671.  Specification of Letters Patent.  Patented Mar. 8, 1910.

Application filed January 9, 1909. Serial No. 471,520.

*To all whom it may concern:*

Be it known that I, WILLIAM B. ARMSTRONG, a citizen of the United States, residing at Sigourney, in the county of Keokuk and State of Iowa, have invented certain new and useful Improvements in Catching and Holding Devices, of which the following is a specification, reference being had therein to the accompanying drawing.

This invention relates to catching and holding tools which are used for catching and holding live stock, such as hogs, chickens, cattle and the like.

It has for its object the provision of an improved holder which may be clamped around the leg of an animal or fowl and securely locked in position by means of an automatic catch.

With this object in view, the preferred embodiment of my invention resides in that arrangement and construction of parts hereinafter described, illustrated in the accompanying drawings, and embraced within the scope of the appended claims.

In said drawings—Figure I is a perspective view of the device. Fig. II is a vertical section of the same. Fig. III is a transverse section on the line 3—3 of Fig. II. Fig. IV is a detailed end elevation of the connection between the operating rod and jaws shown in Figs. I and II, and taken on the line 6—6 of Fig. II.

Similar numerals of reference are employed to designate corresponding parts throughout.

In carrying out the invention I provide a suitable cylinder or tube (1), the diameter of which is sufficient to permit it to be grasped by the hand of the operator, and of any convenient length to suit the purpose for which it is intended. The cylinder or tube is partly closed at one end by a semi-circular head or bearing disk (2), and terminates at the opposite end in a flared mouth (3). The tube forms a housing or closure for the holder proper and its appurtenances, and also acts as a means for closing the jaws around the legs or in the nose of the caught animal. The holder in the present instance is shown to consist of several parts one of which will be termed an operating rod (4), which member is preferably of metal of less diameter and of greater length than the tube 1. It is disposed within the latter and at one end extends beyond the semi-circular head (2) of the tube (1), is provided with a rectangular frame (5), the medial portion of one side of which is secured to the end of the rod, and constitutes a handle through which the fingers of the operator may be inserted. The opposite end of the rod is bifurcated in the direction of its length to provide a socket for the reception of the catching and holding jaws (6 and 7). Each of these members is preferably of a single piece of metal bent adjacent one end at substantially an obtuse angle as shown at $7^a$. The extremity of each bent portion is surmounted by a knob or ball (8), the function of which is to provide an anti-cutting surface when the jaws are inserted into the animal's nose. That portion of each jaw extending from the bent portion $7^a$, is curved inward to a point substantially intermediate its horizontal center and opposite end from whence it is curved reversely, as shown at 9. The jaws are held in pivotal and crossing relation within a socket (10) at the end of the operating rod (4) by means of a pintle (11) by means of which the jaws are pivotally connected to the rod.

From the foregoing it will be understood that the jaws are disposed within the socket (10) and cross each other at the point where the opening for the pintle is formed. This crossing of the jaws will bring the angular portions ($7^a$) and knobs (8) in position to face each other, so that when the rod (4) is reciprocated within the tube (1) the jaws will be projected and retracted.

In order to yieldingly hold the jaws in spread or open position a suitable bow spring (12) is employed, the terminals of which are secured to the opposed inner faces and adjacent the inner ends of the jaws, as shown in Fig. II. This spring holds the inner end portions of the jaws against the inner surface of the tube, and when the rod is forced outwardly so as to bring the reversely curved portion of each jaw into a plane with the flared portion (3) of the tube (1), the spring will force the jaws farther apart, and when the rod is moved in the opposite direction the flared portion will operate to close the jaws as will be obvious.

In order to lock the operating rod against outward movement in the direction of the jaws the following device is employed:—The semi-circular head 2 is centrally provided on its straight side with a concave depression (14), the wall of which is toothed as indicated at 13 and designed to embrace the operating rod (4). Projecting upwardly from and exteriorly of the rear proximal end of the tube (1), as to be in easy reach of the operator, is a bar or handle (15). The locking device is held in position by means of a clamp strap (16) which completely embraces the tube and has its terminals flexed laterally to provide a socket for the terminally enlarged serrated portion (15ª) of the handle (15), the parts being held in detachable relation by means of a pivot bolt (17), as shown in Figs. I to IV.

Having thus described the invention what I claim as new is:

1. A catching and holding tool comprising a cylindrical body having a flaring opening at one end, a rod slidable through said body and having a bifurcated end adjacent the flaring opening of the body, oppositely disposed gripping arms pivotally mounted within said bifurcated ends of the rod, said arms being arranged in crossed relation and having their inner ends adapted to extend into the said body, their outer ends projecting beyond said body and provided with inturned gripping arms, and a spring interposed between the inner ends of the arms.

2. A catching and holding tool comprising a cylindrical body having a flaring opening at one end, a rod slidable therethrough and having a bifurcated end, gripping arms held in crossing and pivotal relation in said bifurcated end, the inner ends of said arms being adapted to project within the body, and the outer ends projecting beyond the same and provided with inturned ends, and a spring interposed between the inner ends of said arms and normally holding the outer arms in a spread-apart position.

In testimony whereof I hereunto affix my signature in presence of two witnesses.

WILLIAM B. ARMSTRONG.

Witnesses:
 Wm. H. Bell,
 M. Biemer, Sr.